INVENTORS
ARTHUR PHILLIP JENTOFT
DANIEL JOSEPH VALLIERE
BY

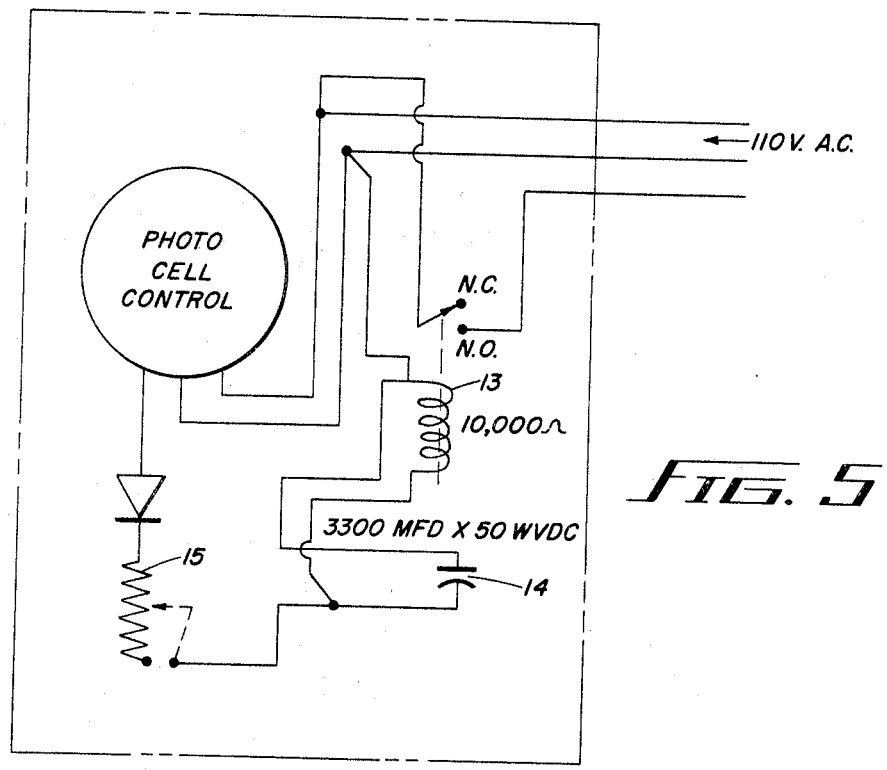
FIG. 5
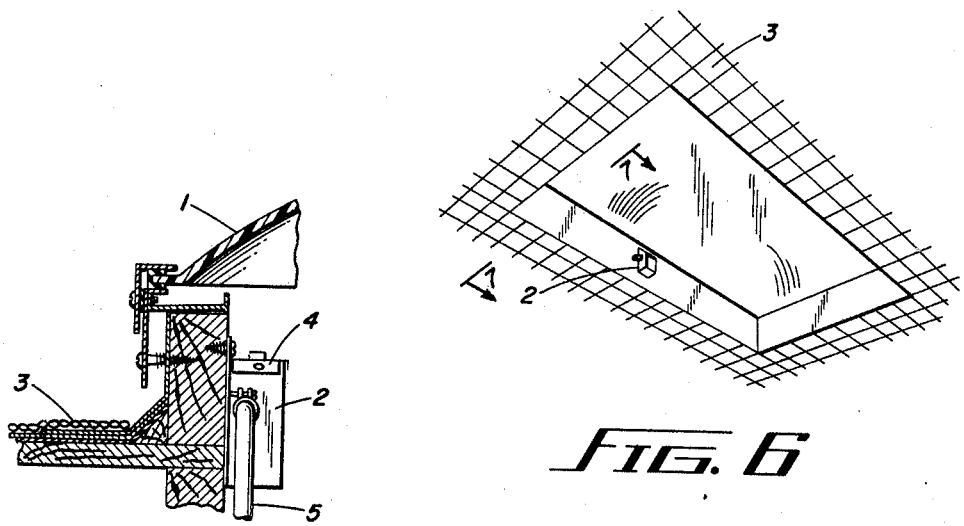
FIG. 7
FIG. 6
INVENTORS
ARTHUR PHILLIP JENTOFT
DANIEL JOSEPH VALLIERE
BY
*James T. Dunn*
ATTORNEY Jan. 6, 1970  A. P. JENTOFT ET AL  3,488,505
SKYLIGHT AND ARTIFICIAL LIGHT ILLUMINATION SYSTEM WITH
AUTOMATIC CONTROL OF LIGHTING INTENSITY
Filed April 5, 1967  6 Sheets-Sheet 6

James T. Dunn
ATTORNEY

United States Patent Office 3,488,505
Patented Jan. 6, 1970

3,488,505
SKYLIGHT AND ARTIFICIAL LIGHT ILLUMINATION SYSTEM WITH AUTOMATIC CONTROL OF LIGHTING INTENSITY
Arthur Phillip Jentoft, R.F.D. 2, Kennebunkport, Maine 04073, and Daniel Joseph Valliere, 76 Byron Road, Apt. 1, Chestnut Hill, Mass. 02160
Filed Apr. 5, 1967, Ser. No. 628,769
Int. Cl. G01j 1/32
U.S. Cl. 250—205　　　　　　　　　　　　　9 Claims

ABSTRACT OF THE DISCLOSURE

Buildings are lighted with a combination of skylights and artificial illumination automatically controlled by photoelectric means so that during the portions of the daytime when daylight illumination through the skylight is sufficient for designed illumination standards, the photoelectric controller turns off the lights when the daylight intensity has reached a predetermined amount in excess of designed illumination, for example, double the light intensity, and the lights are turned on when the daylight illumination drops down to designed illumination intensity.

Preferably, photoelectric control is provided with a time delay circuit, for example, several minutes, so that artificial lights are not cycled on and off for sudden short duration daylight intensity changes.

BACKGROUND OF THE INVENTION

Daylight illumination by skylight has achieved considerable practical success, particularly in recent years when high impact plastic skylights, such as acrylic plastics, have become available. Daylight illumination is not practical alone because of the variation of daylight during the day, particularly in winter, and the problem is intensified in higher latitudes, such as those represented by the northern third of the United States. It has, therefore, been standard practice to provide artificial illumination which can be turned on and off by the users of a building or other space in which the illumination is to be used.

Human nature being what it is, there is a strong tendency to leave the lights on either all day or, at most, to turn them off only occasionally in very bright sunshine. This has resulted in several undesirable occurrences. First of all, there is an extensive waste of electric power when the artificial lighting is used all day or for excessive periods of time. Another disadvantage, or times when air conditioning involving cooling is used, the air conditioning load is unnecessarily increased by the large amount of heat given off by the artificial illumination, and this not only further increases the cost for power but also, in a number of cases, has made excessively large cooling capacity necessary in order to take care of peak loads.

As a result of the above disadvantages, the use of skylights for daylight illumination has been seriously restricted, so much so that in many cases buildings have been designed with no daylight illumination from skylights at all or with very drastically reduced skylighting area so that the unpleasant results of excessive illumination at times when the daylight is very strong and the artificial illumination has not been cut off are avoided. This has not only increased the lighting bill and in summer air conditioning bill for power, but also in winter, particularly in latitudes where the winter can be quite cold, the amount of heating required for the building is unnecessarily high. If skylights could be used to provide day lighting for most of the daylight hours, the heat, in the form of radiation coming through the skylight from the sun, can in cold weather supplement the heat from the building's heating system. Thus, by using skylights, the building's fuel costs for heating can be reduced. It should be noted that where it is possible to use extensive skylights for daylight illumination, and particularly with modern acrylic plastic skylights, there is a very marked greenhouse effect. The acrylic plastic skylights let through the shorter wave radiation of the sun very effectively, but they do not transmit as effectively in the infrared. Hence, they provide a relatively efficient source of light with a lesser percentage of heat and a greater percentage of light per unit of total energy transmitted than is the case for artificial electric illumination. Thus by achieving the desired illumination by use of skylights rather than artificial electric lights, the summer air conditioning loads can be reduced provided the electric lighting is turned off when not required (usually 80% of the daylight hours from 8 a.m. to 5 p.m.).

SUMMARY OF THE INVENTION

The invention utilizes skylighting of buildings or other structures sufficient to provide practically all of the designed lighting intensity from daylight through a considerable portion of the day. This is effected by turning the lights off when the daylight illumination reaches a point sufficiently above designed illumination intensity, for example, twice the illumination level, and turn on the artificial light when the illumination from daylight through the skylights drops down to the minimum standard illumination designed for the particular working space.

In order to prevent excessive cycling with momentary fluctuations in daylight which is annoying to persons and can decrease the useful life of artificial lights, the present invention provides for the substantial gap between the daylight illumination level for which building lighting is designed and the much greater intensity of daylight through the skylights which turns off the artificial illumination.

Long duration tests using an automatic control in skylights under actual daylight environments has shown that a good compromise for most buildings is about a 2 to 1 spread. On the average day this will cause at most two or three cycles of turning off artificial illumination and turning it on again, and keeps it well below excessive figures, such as for example five or six cycles. At the same time, savings in lighting costs of as much as 80% can be achieved, and the life of the lighting elements is kept within practical design limits. With a wider spread such as for example 3 to 1 there would almost never be over two cycles but the saving in artificial lighting energy is reduced. For this reason a difference in illumination level of the order of 2 to 1 is preferred.

Perfection operation is not always achieved because drastic changes in daylight such as a small extremely dark cloud or a lightning flash can turn the artificial light on or off. It is also therefore desirable and preferred to introduce a time delay in the control, for example a resistance-capacitance type using a very large capacitor of several thousand microfarads in parallel with the relay coil and both in series with an adjustable resistor. In extreme cases more than one relay in series may be cascaded.

The sensor is preferably a cadmium sulfide cell but other cells such as selenium cells may be used and the invention is not limited to any particular sensor.

More than one controller may be used where a building is divided into zones that require different illumination, for example office space in one part of the building and a warehouse in another. Initial calibration of the controller is based on the outdoor design level of daylighting and takes into consideration transmission of the skylight. The control is preferably mounted just underneath the skylight in which control is based or several skylights if multiple controllers are employed. The controllers can of course be outdoors but this requires weatherproofing and so mounting indoors directly underneath a skylight is preferred.

The controllers may be calibrated entirely electrically by resistors in series with the light cells but optical calibration is preferably also provided, for example with slides which introduce more or less absorption between the incoming light and the sensor. In general such optical controls can be adjusted once for conditions and then can remain locked. The slides are more rugged than an all electrical control, but where time delay is to be introduced this is preferably electrical although other types of time delays such as thermal types may be used. If the sensor energy is too small for operating relays, for example with sensors of the barrier layer type, amplification is needed. The preferred cadmium sulfide cells can often be used without amplification and are relatively insensitive to temperature changes.

As skylights, and especially acrylic plastic skylights, are cheaply obtainable in standard sizes it is usually preferable to vary the amount of skylight by multiplying the number of skylights rather than using skylights of very different sizes. This also facilitates varying the amount of daylight illumination for different areas in the building. For example 25 ft. candles may be sufficient in storage areas, certain assembly areas may need 60 to 80 ft. candles and in office areas still higher levels, for example 150 ft. candles are often desirable.

The present invention operates practically where the skylights receive fairly uniform daylight over the whole area of the roof. In other words, it is undesirable to place skylights under projections over a roof where they would be seriously shaded. It is, of course, essential that the controllers be located under skylights which are not artifically obscured.

The different daylight levels for turning artificial illumniation on and off are effected by conventional sensors and relays. Thus they are adjusted for switching on an artificial light when daylight drops below the lighting designed for the building when artificial light is used. The sensors and relays are turning off artificial illumination are adjusted for much higher daylight illumination. The relays and photocell controllers are conventional and their exact design forms no part of the present invention. Adjustability of response is however desirable so that the sensors and relays can control turning on and off illumination at the desired values of daylight illumination coming through a skylight onto the partcular controller and sensor in question.

BRIEF DESCRIPTION OF THE DRAWINGS

FIG. 5 is a schematic of a controller circuit with time delays;

FIG. 6 is an illustration of a skylight with attached controller;

FIG. 7 is a cross-section through a portion of FIG. 6 along the line 7—7, and

DESCRIPTION OF THE PREFERRED EMBODIMENTS

Figure 8:
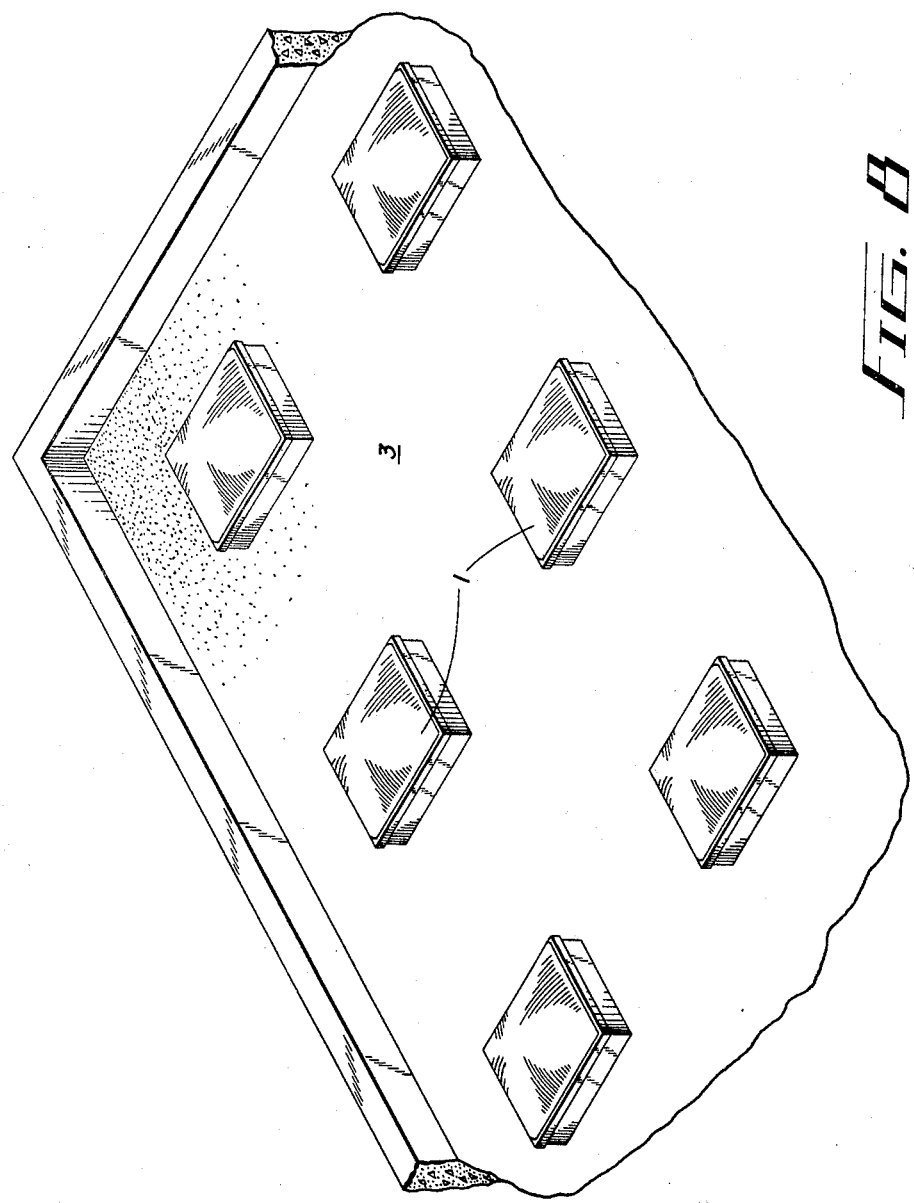
FIG. 8 is an illustration of a roof with a plurality of skylights.

FIG. 8 shows a roof 3 with a series of skylights 1 of polymethylmethacrylate plastic. The figure illustrates the use of a fairly large number of standard sized skylights which, as has been pointed out above, is the preferred way of providing variation of skylight area for different portions of the building for which different illumination intensities are designed.

FIGS. 6 and 7 show a cadmium sulfide controller 2 mounted a few inches below the skylight itself and provided with a calibrating slide 4, which can be moved to introduce varying amounts of light on the cadmium sulfide cell, which is of standard design and hence is not shown in detail. An electrical conduit 5 carries power to the controller and power from the controller relay, which will be described below, to light circuits.

Figure 4:
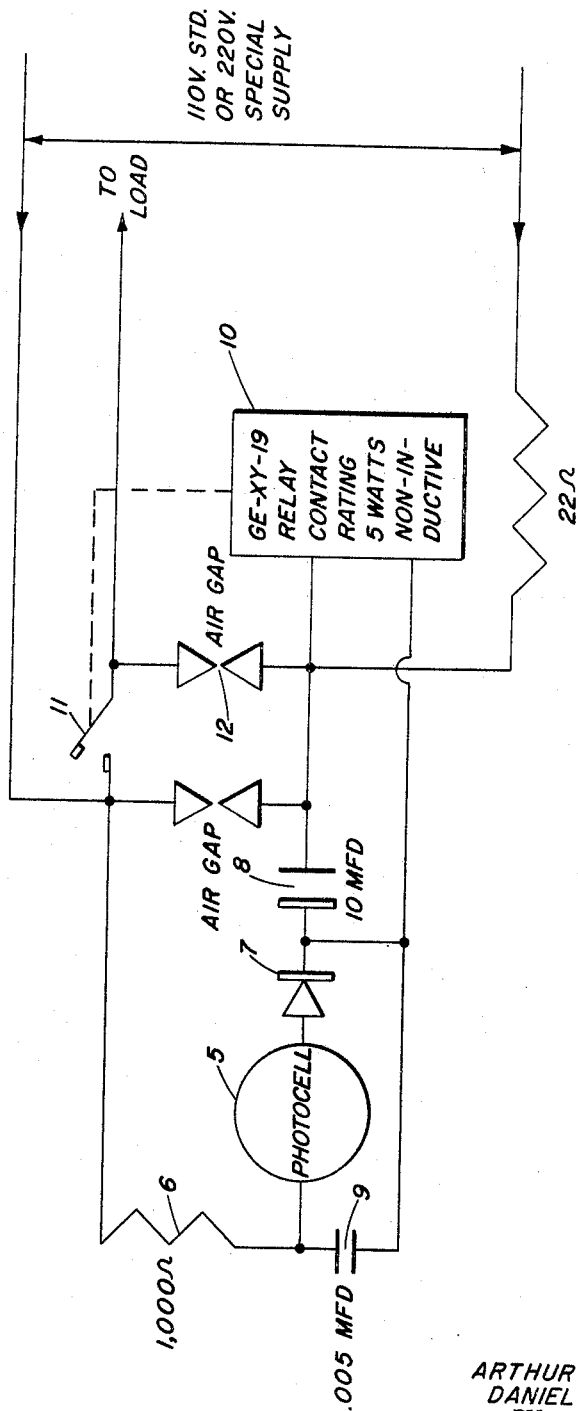
FIG. 4 is a schematic of the photo controller circuit.

In FIG. 4, it will be seen that the cadmium sulfide photocell is in series with an ordinary AC power line through resistor 6, a diode 7, and a capacitor 8. The photocell and diode are by-passed by a smaller capacitor 9. A standard relay 10 closes a contact 11 and passes current to the load. The relay is of a standard type, a typical commercial example being set out in FIG. 4 and the photocell actuates controller is also of standard design and actuated the relay to close contacts under illumination of 1,000 ft. candles but actuates the relay to open contacts only when receiving illumination of 2,000 ft. candles. As the controllers and relays are commercially available items their design forms no part of the invention and accordingly they are shown purely diagrammatically. Lightening arrestors are provided at 2 for protection of the circuits.

The capacitor 8 in FIG. 4 is relatively not very large, and if an extensive time delay of several minutes is required, the modified schematic of FIG. 5 is employed. Here the same elements have the same designations as in FIG. 4 but the relay coil 3 is shown as by-passed with a very large capacitor 14 in series with a variable resistor 15. The resistor can be adjusted so that the voltage across the relay coil will not rise to the point where the relay closes until the capacitor 14 has charged up to a particular value, the time of course being determined by the adjustment of the resistor 15, which determines the time constant of the delay. A typical delay is about two minutes.

Figure 1:
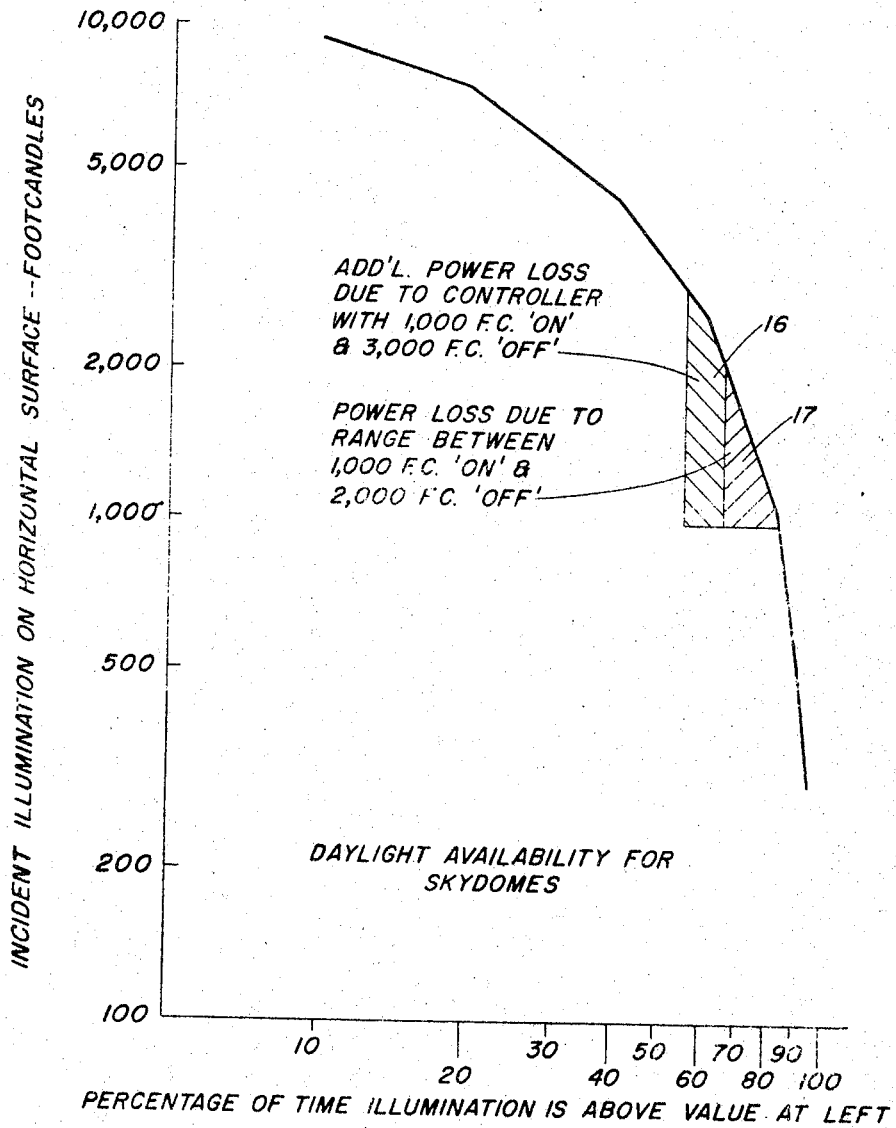
FIG. 1 is a curve showing the different efficiencies with different illumination spreads for on and off and also the percentage time when the daylight is above minimum for a particular day.
Figure 2:
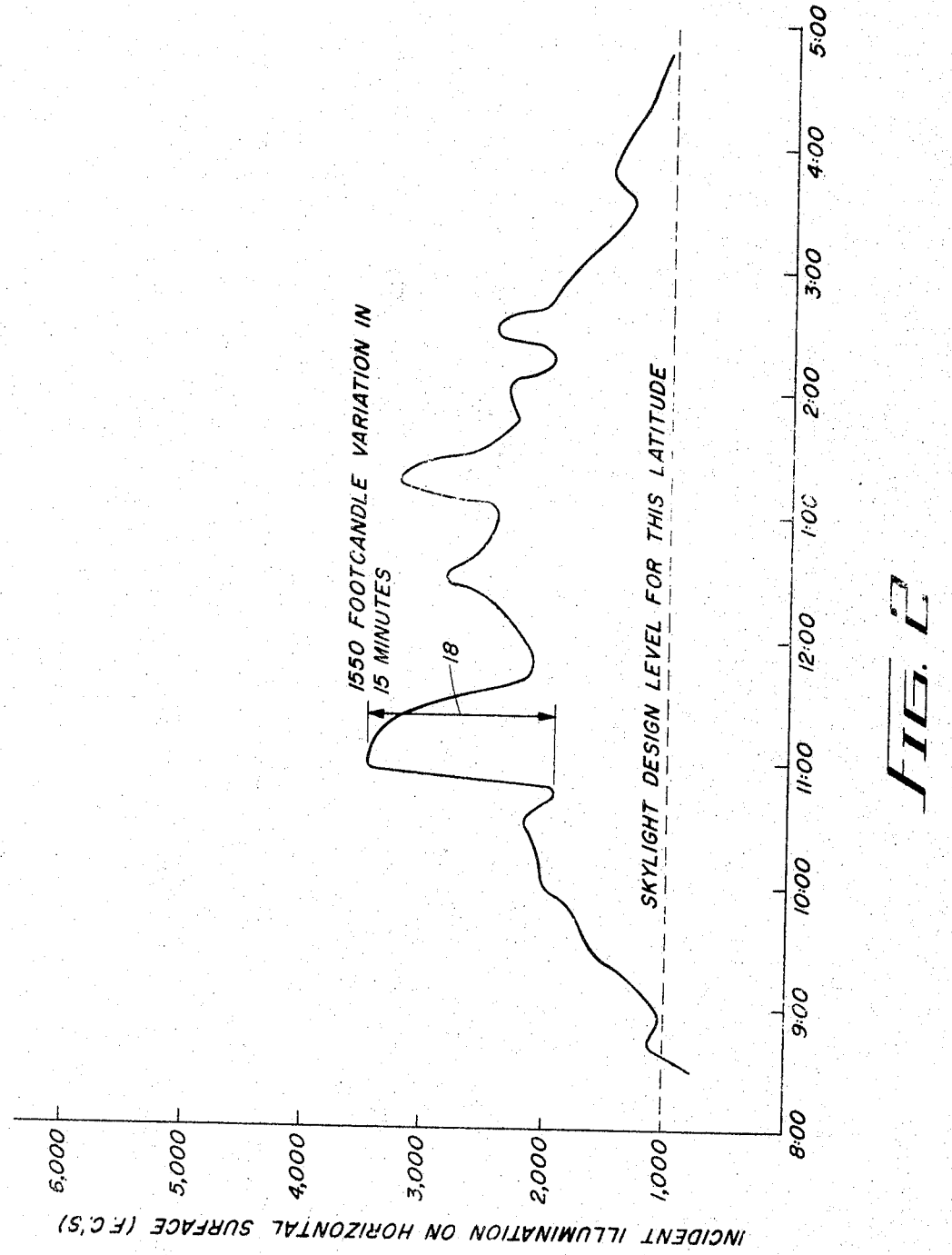
FIG. 2 is a curve during an average winter day but showing a very marked variation due to clouds.
Figure 3:
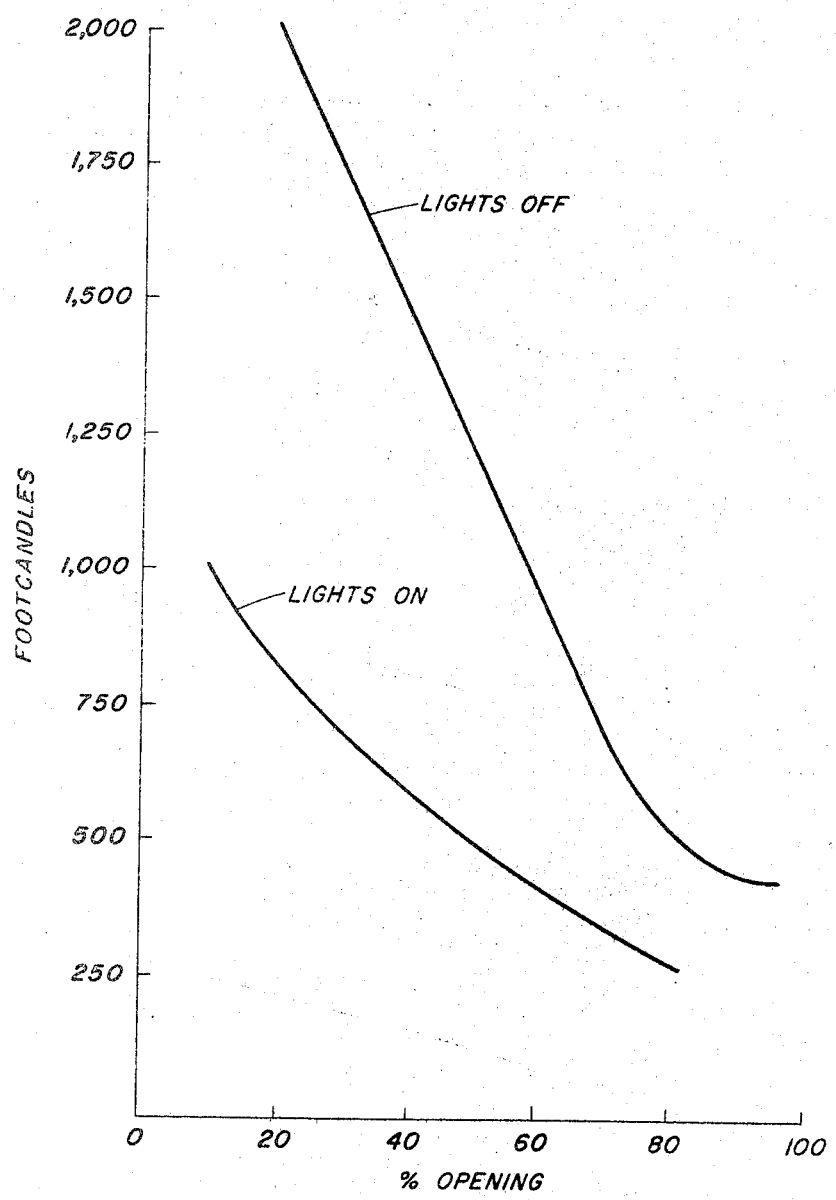
FIG. 3 are curves similar to FIG. 1 for condition with lights on and with lights off.

FIGS. 1 to 3 show curves of typical operating conditions, FIG. 1 showing how the variation of percentage of daylight available for different incident illumination values. The figures are given in foot candles. The hatched areas 16 and 17 show how much of the theoretical hours of daylight are lost for different adjustments. Using 1,000 foot candles as the designed illumination level, it will be seen that if the amount to turn the lights off corresponds to 2,000 foot candles, the preferred range of difference, the power lost is represented by the area 17. If it is desired to reduce the number of cycles to the absolute minimum, which can be effected for example by a 3 to 1 adjustment of the controller, the additional power loss is represented by the area 16. FIG. 1 illustrates what has been described above that the greater the difference between the daylight for lights on and lights off, the fewer cycles but the greater the power loss.

FIG. 2 illustrates a winter day in February in the northern third of the United States, which is an unusual situation with an extremely large change of daylight over a 15-minute period in the late morning. This is a change of 1550 foot candles and is shown at the arrow 18. With a 2 to 1 ratio of ON to OFF, the lights would be turned off about 10:00 a.m. but would go on again briefly at the low point of the arrow, causing an additional cycle. Of course the lights would finally be turned on again before five o'clock.

FIG. 3 is a curve which shows the foot candles when the lights are on and when the lights are off for optical calibration slide plate adjustments from 100% open to 0% open. If the slide plate is adjusted to turn the lights off at 2,000 foot candles, they would not come on again until about 1,000 foot candles.

It should be noted that the particular designed illumination level can be fixed in different portions of the building by varying the number of the skylights. Of course where part of the building required very much lower illumination, for example a warehouse area, there would be fewer skylights, but the controllers would be set to turn the lights on when the outdoor illumination level reached is that used to size and space the skylights. This, of course, would be the same outdoor level as in the case of an office, where a higher designed illumination would be provided. However, correspondingly more skylights would be required in the latter space. Hence all areas could theoretically be operated from one control. However, areas are often zoned for practical purposes and hence the calibration of each control would depend upon the luminous transmission of the skylight through which it views the outdoor illumination level.

The specific description has been in terms of a building in which the spread in illumination levels for lights ON and lights OFF is the same, even though the different parts of the building may have lower or higher designed normal illumination. It is, of course, possible to have a different spread in different parts of the building, and it is an advantage of the invention that this is possible. For example, in areas of offices or drafting rooms, the annoyance of repeated cycling of the artificial lights on and off might dictate a relatively greater spread between designed illumination and the amount of daylight when lights would be turned off. This could be 2 to 1 or even higher. On the other hand, certain parts of the building, such as warehouses, might not present a situation where more repeated cycling on and off would be annoying, and in such parts of the building a narrower spread, for example, in areas of offices or drafting rooms, the an- a maximum saving of electric power for lights. The invention is very flexible and the best compromise for each particular part of the building or for each building can be chosen.

We claim:
1. A system for proportioning daylight illumination to artificial illumination comprising in combination,
(a) a building area having a minimum designed illumination and artificial lights providing this minimum,
(b) skylights receiving daylight illumination over the area, the number of skylights corresponding to that required to provide a predetermined illumination above that of the minimum illumination for a predetermined average portion of normal daylight hours,
(c) a photoelectric controlling means for said area positioned to receive daylight from at least one of the skylights,
(d) means actuated by the photoelectric controlling means for turning the artificial illumination off and on, said last mentioned means responding to a level of illumination for turning lights on corresponding substantially to the minimum daylight design illumination for the region of the country as viewed from inside the skylight and said last mentioned means responding to a level of illumination for turning lights off which is sufficiently greater than the minimum so that during an average day cycling of lights on and off is reduced to a point where annoyance to personnel in the area does not take place.

2. A system according to claim 1 in which the illumination level for turning lights off is of the order of magnitude of twice the minimum designed illumination level.

3. A system according to claim 1 in which response of the means for turning lights off is provided with a delay of the order of minutes whereby sudden, brief changes in external illumination of a magnitude greater than the ratio of off illumination to on illumination provided in the system will not immediately turn off the lights.

4. A system according to claim 3 in which the photoelectric controlling means actuates the lights through a relay means in series with a resistance and the relay actuating coil is by-passed with a large capacitor whereby the relay is not turned on until after a delay time sufficient to charge the capacitor up to relay actuation potential or is not turned on until the capacitor has discharged to below the relay actuation potential.

5. A system according to claim 1 in which the photoelectric controlling means actuates the lights through relay means in series with a resistance and the relay actuating coil is by-passed with a large capacitor whereby the relay is not turned on until after a delay time sufficient to charge the capacitor up to relay actuation potential or turned off until after a delay time sufficient to discharge the capacitator below the relay actuation potential.

6. A system according to claim 1 comprising a building having a plurality of areas of different designed minimum illumination levels and photoelectric controlling means are provided for each area so that the lights thereof are controlled independently of other areas.

7. A system according to claim 1 in which the skylights are of light transmitting, acrylic plastics.

8. A system according to claim 2 in which the skylights are of light transmitting, acrylic plastics.

9. A system according to claim 5 in which the skylights are of light transmitting, acrylic plastics.

References Cited
UNITED STATES PATENTS

| | | | |
|---|---|---|---|
| 1,788,111 | 1/1931 | Knowles | 315—151 X |
| 2,155,224 | 4/1939 | Geffcken et al. | 250—200 X |
| 2,882,450 | 4/1959 | McCabe | 315—151 |
| 2,978,591 | 4/1961 | Ringger | 250—239 |
| 3,068,753 | 12/1962 | Kirkpatrick | 350—263 |
| 3,329,820 | 7/1967 | Weber | 250—205 |
| 3,379,892 | 4/1968 | Neagle | 250—239 X |

WALTER STOLWEIN, Primary Examiner

U.S. Cl. X.R.
315—151; 350—258